United States Patent [19]
Hanisko

[11] Patent Number: 5,637,794
[45] Date of Patent: Jun. 10, 1997

[54] RESISTIVE BRAKE LINING WEAR AND TEMPERATURE SENSING SYSTEM

[75] Inventor: John-Cyril P. Hanisko, Southfield, Mich.

[73] Assignee: Eaton Corporation, Cleveland, Ohio

[21] Appl. No.: 577,363

[22] Filed: Dec. 22, 1995

[51] Int. Cl.[6] .................................................. B60T 17/22
[52] U.S. Cl. ........................... 73/121; 73/129; 188/1.11; 340/454; 340/453
[58] Field of Search ................... 188/1.11; 340/453, 340/454; 73/121, 129

[56] References Cited

U.S. PATENT DOCUMENTS

| | | | |
|---|---|---|---|
| 1,957,051 | 5/1934 | Norton | 73/121 |
| 2,494,269 | 1/1950 | Sparkes | 177/311 |
| 3,088,549 | 5/1963 | Borsa | 340/454 |
| 3,271,737 | 9/1966 | Bezemek | 340/454 |
| 3,735,343 | 5/1973 | Lane et al. | 340/454 |
| 3,805,228 | 4/1974 | Peeples | 340/454 |
| 3,808,593 | 4/1974 | Kopernik et al. | 340/454 |
| 3,825,891 | 7/1974 | Kinast | 340/454 |
| 3,887,040 | 6/1975 | Simon et al. | 340/454 |
| 3,902,157 | 8/1975 | Kita et al. | 340/454 |
| 4,204,190 | 5/1980 | Wiley et al. | 340/454 |
| 4,520,661 | 6/1985 | Tamai et al. | 73/129 |
| 4,606,435 | 8/1986 | Johnson | 340/454 |
| 4,641,519 | 2/1987 | Klein et al. | 73/129 |
| 4,646,001 | 2/1987 | Baldwin et al. | 340/454 |
| 4,674,326 | 6/1987 | Reinecke | 188/1.11 |
| 4,685,540 | 8/1987 | Rath et al. | 188/1.11 |
| 5,307,673 | 5/1994 | Ito et al. | 73/129 |
| 5,419,415 | 5/1995 | Lamb et al. | 340/454 |
| 5,477,943 | 12/1995 | Enomoto et al. | 73/129 |

FOREIGN PATENT DOCUMENTS

| | | | |
|---|---|---|---|
| 0418360 | 8/1974 | U.S.S.R. | 73/129 |

*Primary Examiner*—George M. Dombroske
*Attorney, Agent, or Firm*—Loren H. Uthoff, Jr.; Howard D. Gordon

[57] ABSTRACT

A brake lining temperature and wear sensor having a plurality of serially connected wire loops and a resistive temperature sensor having a lower range of resistance than any one resistor mounted in a cavity formed in the brake lining where a plurality of resistors are connected one to each wire loop to be sequentially connected to a sensor circuit as the brake lining wears and breaks each wire loop. A control unit provides an electrical current to the sensor circuit and monitors the electrical potential across the plurality of wire loops and the resistive temperature sensor and then generating an output signal representing the temperature and wear of the brake lining. In an alternate embodiment, a capacitor is connected across the plurality of wire loops and a resistive temperature sensor with a large range of resistance is used to monitor the brake lining temperature. The electrical current is turned off and on to provide a noncontinuous measurement of first the temperature of the brake lining and then at a later time a measurement of the wear of the brake lining.

7 Claims, 5 Drawing Sheets

RESISTIVE BRAKE LINING WEAR AND TEMPERATURE SENSING SYSTEM

BACKGROUND OF THE INVENTION

1. Field of the Invention

The present invention relates to a brake lining wear and temperature sensing system. More specifically, the present invention relates to a brake lining wear and temperature sensing system using an array of resistors and associated wire loops and a thermistor disposed within the lining.

2. Description of the Prior Art

Various brake lining wear detection systems are known in the art. In addition, temperature measurement systems are known, although very few methods are known which combine the capability of detecting brake wear along with detecting the operating temperature of the brake lining. U.S. Pat. No. 5,419,415, the disclosure of which is incorporated herein by reference, discloses an apparatus for monitoring the operating temperature and providing a signal when the brake lining reaches a service wear point for an elevator brake. An electrically conductive wire loop and a temperature sensitive resistor are disposed within the brake lining. Monitoring the resistance of the temperature sensitive resistor yields a signal which represents the operating temperature of the brake lining so that extreme temperature conditions can be detected and corrective action taken. Once the electrical conductive loop is worn away, an open circuit is detected which signals the need for lining replacement.

U.S. Pat. No. 4,204,190, the disclosure which is hereby incorporated by reference, describes a brake lining wear detection system where a detecting means signals when an embedded conductive wire loop is broken and furthermore, when electrical contact is made between the wire loop and a brake drum surface thereby indicating the lining wear out point. Likewise, U.S. Pat. No. 3,825,891, the disclosure which is hereby incorporated by reference, describes a brake lining wear indicator system where an electrical circuit signals when an embedded wire loop is broken due to wear of the lining and/or when the wire loop contacts the brake drum. In addition, U.S. Pat. No. 2,494,269, the disclosure which is hereby incorporated by reference, discloses a brake wear and temperature measurement system where a plurality of thermo-responsive elements are disposed within the brake lining where each element is selectively monitored to determine if abnormal temperatures have been encountered and/ or whether the brake lining has worn to such an extent that one or more of the thermally responsive elements have been broken.

A more traditional brake temperature indication means is disclosed in U.S. Pat. No. 1,957,051 where a thermocouple is disposed within the brake lining connected to a display means to indicate operating temperature of the brake lining. A similar technique is used in U.S. Pat. No. 4,520,661, the disclosure which is hereby incorporated by reference, where a combination temperature and wear sensor is disposed in a brake cylinder where the sensor has a slider mechanism that is pressed on the face of a brake cylinder to indicate brake wear and also includes a temperature sensing device thereby indicating the wear of the brake lining and overheating of the brake fluid through a pair of lead out wires.

U.S. Pat. No. 4,646,001, the disclosure of which is incorporated herein by reference, discloses a resistive array connected to a plurality of conductive strips that are disposed within the brake lining. Each wire is located at a selective height of the brake lining and as each conductive strip is broken due to wear of the brake lining, resistive elements are added to the detection circuit, the brake lining wears, the overall resistance of the resistive array increases. The resistive elements are positioned outside of the brake lining to prevent damage and drift due to temperature changes. No temperature sensing capability is included in this particular system.

What is needed in the market is a compact, inexpensive and reliable method of measuring brake wear and monitoring brake temperature using one sensor and a simple controller unit.

SUMMARY OF THE INVENTION

The present invention provides for the sensing of various degrees of brake lining wear along with measurement of the operating temperature of the brake lining using a control unit connected to an array of conductive loops and a resistive temperature sensor such as a thermistor or a resistive temperature detector (RTD) generating an output signal on two electrical conductors. Electrical wire loops are connected in series in an electrical circuit and are disposed within the brake lining at various selected wear heights, where each wire loop is connected to a resistive element mounted on a substrate external to the brake lining. The overall resistance of the resistor array increases as the brake lining wears to different heights above the brake table since, as each wire loop is worn through, another resistive element is added to the electrical circuit. A resistive temperature sensor is also disposed within the brake lining and connected in series with the resistors to form the resistor array and is used to monitor the operating temperature of the brake lining. The maximum resistive change of the resistive temperature sensor is selected to be smaller than the resistance of any individual resistive element in the resistor array. In this manner, relatively small changes in the circuit resistance indicate brake operating temperature changes while a relatively large change in circuit resistance indicates that a wire loop has been broken. A method of using a two wire output to transmit both temperature and wear information is disclosed.

In an alternate embodiment, a non-continuous measurement of the resistive array is used to monitor wear and temperature where a capacitor is connected in parallel with the resistors and the temperature of the brake lining can be monitored by turning a power supply on and off the measuring the resistive temperature sensor output and after a period of time, the output of the brake wear resistive array is measured using only a two wire output line from the resistor array. The two wire output signal can be used to measure both brake wear and brake lining temperature using a capacitive element to provide a variable time constant depending on which parameter is to be monitored. In this manner, the resistive change in the resistive temperature sensor can be greater than any or all of individual resistive elements in the resistor array and still provide for separate detection of the brake lining temperature and brake lining wear.

DETAILED DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
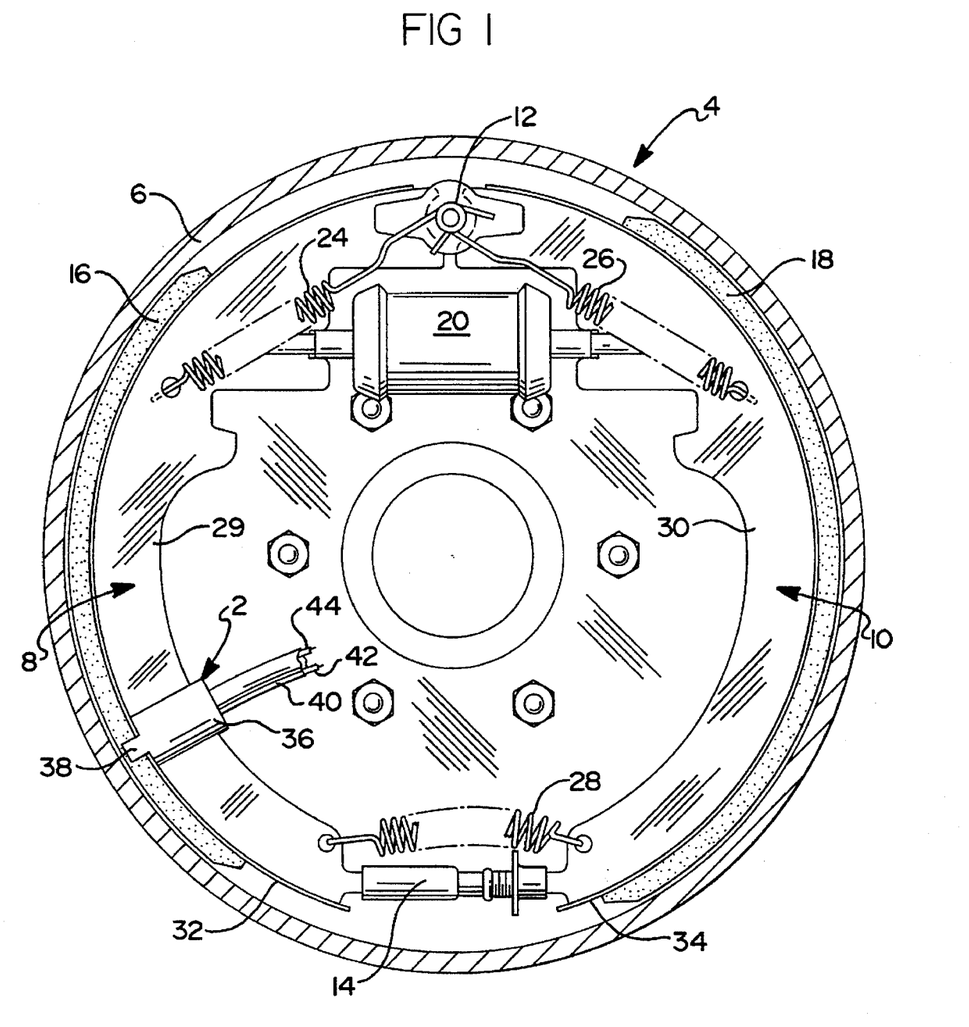
FIG. 1 is a partial cross-sectional view of the brake lining wear and temperature sensing system of the present invention installed on a brake assembly.

Now referring to FIG. 1 of the drawings, a partial cross-sectional view of the brake lining wear and temperature sensing system of the present invention is shown where a brake sensor 2 is shown mounted on a brake assembly 4. The brake assembly 4 includes a brake drum 6 and brake shoes 8 and 10 engaging an anchor pin 12 at their upper ends. A conventional lining wear adjustment mechanism 14 connects the lower ends of the shoes 8 and 10 and a wheel cylinder 20 is provided to actuate the brake shoes 8 and 10 into engagement with the drum 6 when it is desired to retard the movement of a vehicle. The brake shoes 8 and 10 have brake linings 16 and 18 respectively, secured thereto and are biased to a retracted position by return springs 24 and 26 respectively, while a spring 28 is provided to maintain the lower ends of brake shoes 8 and 10 into engagement with adjustment mechanism 14. The brake linings 8 and 10 are bonded to brake tables 32 and 34 respectively while the brake tables 32 and 34 are mounted on brake webs 29 and 30 respectively. It is specifically understood that any known type of brake mechanism could be utilized including but not limited to S-cam brakes and disc brakes.

The brake sensor 2 of the present invention is mounted to the brake table 32 of brake shoe 8 and a similar sensor could be mounted to the brake table 34 of brake shoe 10. The brake sensor 2 consists of a main body 36, a sensing head 38 and a connector 40. The main body 36 is mounted to the brake table 34 and supports the sensing head 38 where the sensing head 38 extends into the brake lining 16 and is secured using an epoxy, ceramic or other type of suitable cement to bond the sensing head into the brake lining 16 while allowing the sensing head 38 to wear away with the brake lining 16. The connector 40 consists of two electrical leads 42 and 44 which serve to electrically connect the sensing head 38 to a control unit 48 (see FIG. 2).

Figure 2:
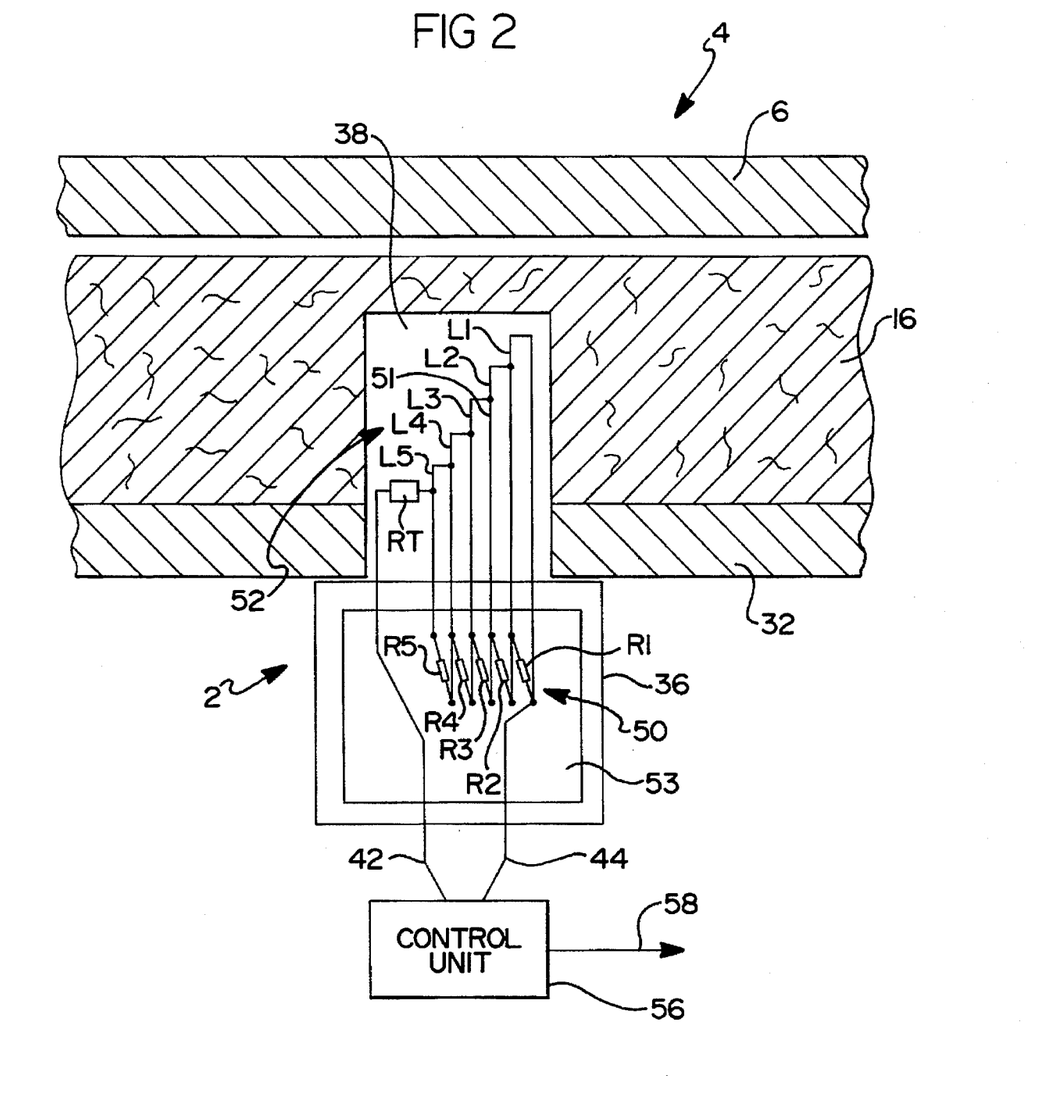
FIG. 2 is a partial cross-sectional view of the brake lining wear and temperature sensing system of the present invention.

Now referring to FIG. 2 of the drawings, a cross-sectional view of the brake lining wear and temperature sensing system of the present invention is shown where a partial cross-sectional view of the vehicle brake assembly 4 as shown in FIG. 1 is illustrated where the vehicle brake assembly 4 includes a brake lining 16 which is supported and attached to a brake table 32 in a conventional manner. According to the present invention, a plurality of wire loops L1, L2, L3, L4 and L5 are disposed at different heights within the brake lining 16 where the heights are selected to indicate various points of wear of the brake lining 16. The wire loops L1, L2, L3, L4 and L5 are electrically connected to a like plurality of resistors R1, R2, R3, R4 and R5 which make up resistor array 50. Note that each pair of adjacent wire loops share a common lead and are therefore connected serially. For example, wire loops L2 and L3 share common lead 51 which is attached to R2. In this manner as L1 is opened, resistor R1 is then connected to leads 42 and 44, then when L2 is opened, both resistors R1 and R2 are connected in series to leads 42 and 44 and so on until resistors R1-R5 are connected. As each of the wire loops L1, L2, L3, L4 and L5 are broken in sequence, when the brake lining 16 wears to the height of each particular wire loop L1-L5, the associated resistors R1, R2, R3, R4 and R5 are activated and placed in series in the electrical sensor circuit 53. The resistor array 50 is located outside of the brake lining 16 to prevent electrical drift due to temperature gradients and is mounted on an electrical circuit board or substrate 53 contained within the main body 36 which is suitably mounted to the brake table 32.

Wire loops L1-L5 make up sensing array 52 which is preferably grouped into a small cross-sectional package for insertion and mounting within the brake lining 16. Also included as part of the sensing array 52 is a resistive temperature sensor such as a thermistor or a resistive temperature detector (RTD) where a thermistor RT is used which is functionally a resistor which changes its resistance value according to the temperature of the environment in which it is placed. The thermistor RT is electrically connected in series with resistors R1-R5 when their respective wire loops L1-L5 are broken and is part of the resistor array 50. The resistor array 50 is electrically connected to a control unit 56 through electrical leads 42 and 44. Wire loop L1 is located at the highest distance away from the brake table 32 where wire loop L2 is at the next highest location in the brake lining 16 from the brake table 32 and likewise for L3, L4 and L5 such that when the brake lining 16 is initially worn, the wire loop L1 first breaks and with additional wear of the brake lining 16, wire loop L2 breaks in a like manner finally wire loop L5 breaks signaling that the brake lining 16 needs replacement. It is expressly anticipated that any number of wire loops and respective resistors could be used in order to indicate various wear points of the brake lining 16 in a similar manner. Also, it is contemplated that the present invention could be used on any type of brake including, but not limited to S-cam brakes and disc brakes.

Figure 3:
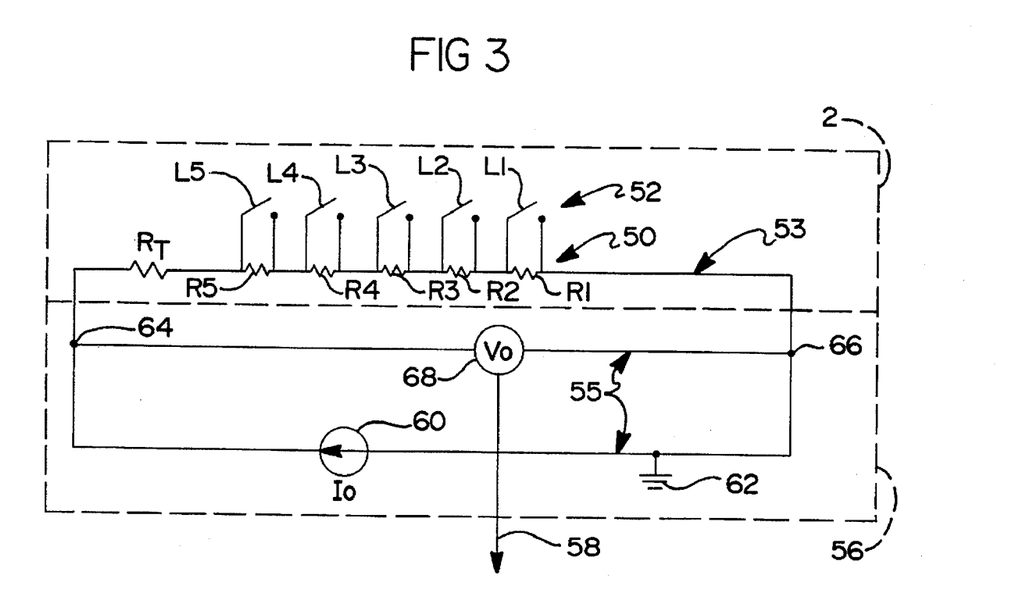
FIG. 3 is an electrical schematic of the brake wear and temperature sensing system of the present invention.

Now referring to FIG. 3, an electrical schematic of the brake lining wear and temperature sensor of the present invention is shown where the sensing array 50 is comprised of wire loops L1-L5 and temperature sensor RT where each wire loop L1, L2, L3, L4 and L5 are electrically connected to their respective resistors R1, R2, R3, R4 and R5 in resistor array 50 and make up the sensor circuit 53. The control unit 56 contains a current source 60 which supplies a constant electrical current Io to the resistor array 50 and an electrical ground 62 where a voltage potential Vo, measured by measuring device 68, indicates the degree of wear of brake lining 16 and/or the operating temperature of the brake lining 16 which makes up the control circuit 55. The wear and temperature signals are transmitted to some type of output device (not shown) on output line 58. The temperature sensor RT is connected in series with the resistors R1-R5 and then electrically connected to contact point 64. The resistors R1-R5 are connected to the temperature sensor RT and also to contact point 66 where contact points 64 and 66 along with current source 60 and voltage measuring device 68 reside within the control unit 56 represented in FIG. 3 by the broken lines. The voltage measuring device 68 measures the voltage across contact points 64 and 66 which varies according to brake lining wear and temperature labeled as Vo for output voltage.

Analyzing the circuit schematic shown in FIG. 3 produces the result, $V_o=I_o \times (R_T+$ summation of the resistance values R1 through R5) depending on which, if any, of the loops L1 through L5 have been broken. $V_o$ represents the voltage across contact points 64 and 66 as measured by the voltage measuring device 68. Thus, $V_o$ increases in amplitude as the brake lining 16 is worn through successive levels, represented by the height of the wire loops L1–L5. Thus, by monitoring the voltage between contact point 64 and contact point 66, both the brake lining wear and temperature can be measured and the result output to another device on output line 58. As the brake lining 16 wears, the wire loops L1–L5 are broken in turn, which results in a definite step up in the voltage level $V_o$ between contact points 64 and 66, as additional resistors are introduced into the circuit. The resistance value of the temperature sensor is smaller than the resistance value of any of the resistors R1–R5, such that the voltage change as measured between contact points 64 and 66 will be relatively small, until one of the wire loops L1–L5 is broken, which results in a substantial step change in the output voltage level as measured between contact points 64 and 66 by voltage measuring device 68 and output on output line 58. Thus, relatively small changes in the output voltage $V_o$ are due solely to changes in the operating temperature of the brake lining 16, whereas substantially large step changes in the level of the $V_o$ voltage indicate that one or more of the wire loops L1–L5 have been broken and that the brake lining 16 has worn to such an extent that one of the wire loops L1–L5 has broken.

For example, the value of the temperature sensor RT could vary from a resistive value of 850 ohms at a temperature of –40° C. up to a value of 4,500 ohms at a temperature of 400° C. and the values of each of the resistors R1, R2, R3 and R4 could be 5,000 ohms each. In this manner, any changes in the output voltage between contact points 64 and 66 due to anything less than 5,000 ohms would be attributable to changes in the operating temperature of the brake lining 16 as measured by the change in the resistive value of the temperature sensor RT. Any step changes in voltage attributable to a change in resistance of 5,000 ohms would be due to the break in one of the wire loops L1–L5 indicating a change in the remaining thickness of the brake lining 16.

Figure 4:
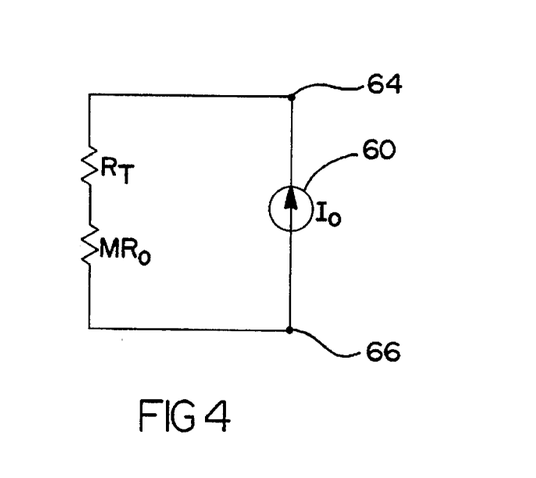
FIG. 4 is a partial schematic diagram of the electrical circuit of the brake lining wear and temperature sensing system of the present invention.

Now referring to FIG. 4 of the drawings, a simplified partial schematic of the sensor circuit of the present invention is shown. Referring specifically to FIG. 4, consider a system which consists of a temperature sensor and a thickness sensor both implanted in a brake lining, and a relatively remote control unit 56. Let the temperature sensor be a temperature-sensitive resistor shown as thermistor RT, with a resistance, at temperature T symbolized by $R_T(T)$. For convenience, let $R_T$ vary directly with T. Let $T_{LO}$ be the lowest temperature expected and $T_{HI}$ be the highest temperature expected. Then, we have $$0 < R_T(T_{LO}) < R_T(T) < R_T(T_{HI}), \text{ for } T_{LO} < T < T_{HI}.$$

Let the thickness sensor MR be a breakable conductor resistor array 50. Let there be N resistors in the array where N=5 for system shown in FIG. 3. Let each of the N resistors have the same resistance, $R_o$. Let $R_o > R_T(T_{HI})$. Let the temperature sensor (thermistor RT) and the resistor array 50 be connected in series where M is the number of broken conductors in the array (M $\leq$ N). Let a constant current, $I_o$, generated by the current source 60 as shown in FIG. 3 be driven into the series resistance at point 64 and extracted at point 66, as shown. Hence, the voltage measured across these points, VP, is $$VP = I_o(R_T + MR_o)$$

since $R_T(T_{HI})$ is the maximum value of $R_T$ and since $$R_T(T_{HI}) < R_o$$

we have $$I_o MR_o < VP < (M+1) R_o I_o$$

This forms the basis for the method of the present invention by which only two wires are needed to obtain temperature and thickness information in an easily separable form.

When the remote processor measures VP such that $$I_o MR_o < VP < (M+1) R_o I_o$$

it subtracts the known quantity $I_o MR_o$ from VP, yielding $$VP - I_o MR_o = I_o R_T$$

since $I_o$ is also known, as is the relation between T and $R_T$ (T), we may obtain $$T = f^{-1} \frac{(VP - I_o MR_o)}{I_o}$$

where we have $R_T = f(T)$.

Also since $I_o$ and $R_o$ are known, thickness information is obtained as $$M = \frac{I_o MR_o}{I_o R_o}$$

Figure 5:
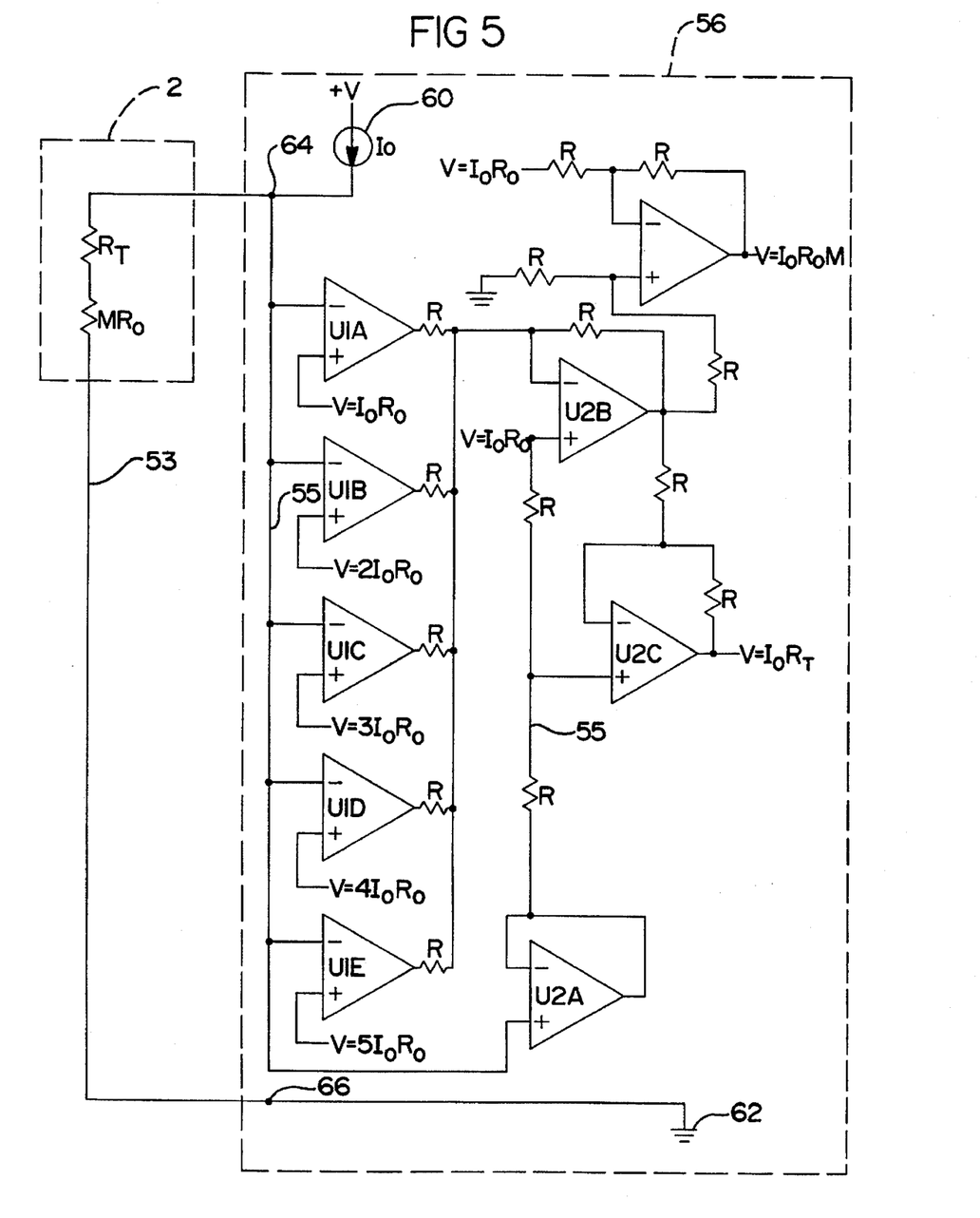
FIG. 5 is a schematic diagram of the electrical circuit of the brake lining wear and temperature sensing system of the present invention.

One means of implementing this signal processing for N=5 is shown in FIG. 5 which is a schematic of the sensor circuit 53 of the brake sensor and of the control circuit 55 contained within the control unit 56. All of the resistors R are selected using known circuit design methods. All of the comparators U1A, U1B, U1C, U1D, U1E, U2A, U2B, U2C and U2D are components selected using known circuit design methods.

Devices U1A–U1E are open-collector comparators, with switching threshold voltages $I_o R_o$, $2I_o R_o$, $3I_o R_o$, $4I_o R_o$ and $5I_o R_o$ respectively, devices U2A–U2D are operational amplifiers. The output of U2A is $V_{U2A} = _o(R_T\ MR_o)$. The output of U2B is $V_{U2B} = I_o R_o (1+R/R/M) = I_o R_o (1+M)$. The output of U2C is $$\begin{aligned} V_{U2C} &= [I_o(R_T + MR_o) \cdot R/2R + I_o R_o \cdot \\ & \quad R/2R] \cdot (1 + R/R) - V_{U2B} \cdot R/R \\ &= I_o R_T + I_o(1+M) R_o - I_o R_o(1+M) = I_o R_T \end{aligned}$$

The output of U2D is $$V_{U2D} = V_{U2B} \cdot R/2R\ (1+R/R) - I_o R_o \cdot R/R = I_o R_o M.$$

If we arrange $I_o R_o = 1$, then $V_{U2D} = M$, directly.

Figure 6:
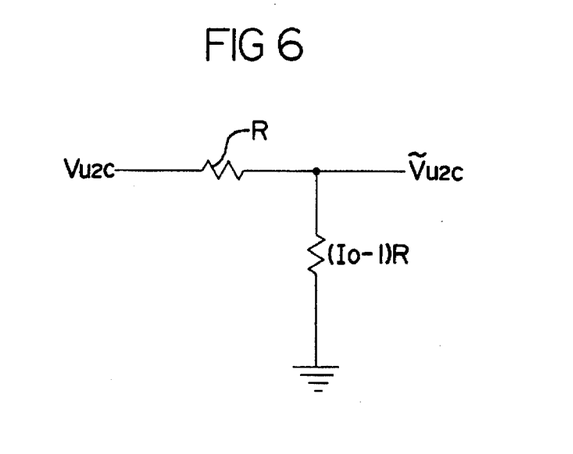
FIG. 6 is a partial schematic diagram of the electrical circuit of the brake lining wear and temperature sensing system of the present invention.

Furthermore, if we arrange the circuit as shown in FIG. 6, then $V_{U2C}$–RT in k ohms.

The gain, $G_{U2B}$, of U2B is given by $$G_{U2B}=1+R/R_i$$

where $R_i$=resistance between the inverting input of U2B and ground.

M=0→$I_o$ ($R_T$+$MR_o$)=$I_oR_T$<$I_oR_o$. Thus, no U1 comparator switching threshold is exceeded; therefore, no U1 comparator is conducting and $R_i$→∞. In this $$G_{U2B}=1+0=1.$$

M=1→$I_o$ ($R_T$+$MR_o$)=$I_o$ ($R_T$+$R_o$)>$I_oR_o$. Thus, U1A is conducting and $R_i$=R. Then, $$G_{U2B}=1+1=2.$$

M=2→$I_o$ ($R_T$+$MR_o$)=$I_o$ ($R_T$+2$R_o$)>2$I_oR_o$. Thus, U1A and U1B are conducting and $R_i$=R/2. Then, $$G_{U2B}=1+R/R/2=1+2=3.$$

capacitive and resistive circuit as shown.

Thus, using this method, only two wires, that wire between 64 and RT and that wire between $MR_o$ and 66, are used to transmit the summation of brake lining temperature information and brake lining thickness information, and these two types of information can be readily separated in the control unit.

Figure 7:
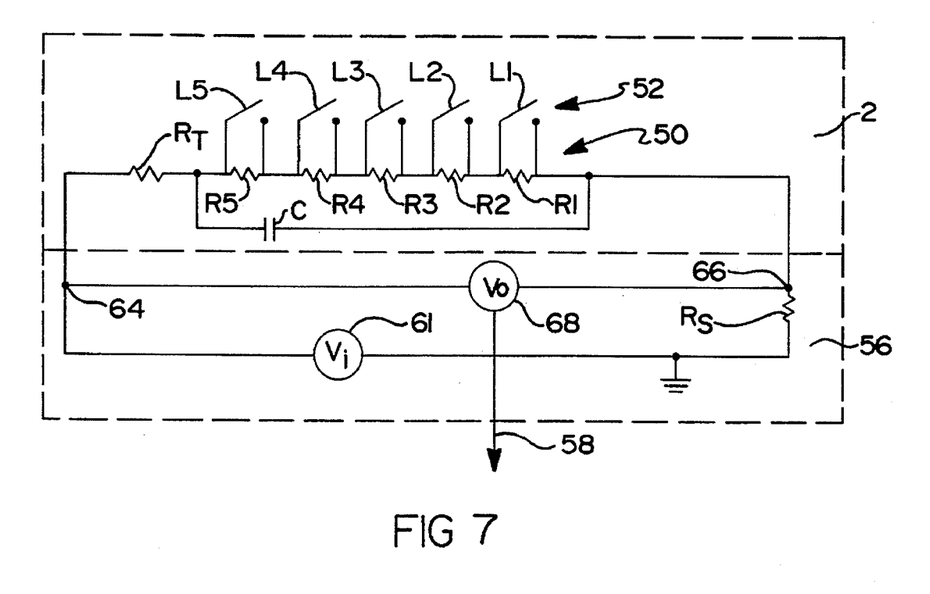
FIG. 7 is an alternate embodiment of the electrical schematic of the brake lining wear and temperature detection system of the present invention.

Now referring to FIG. 7, an alternate embodiment of the electrical circuit for the present invention is shown, which allows resistance changes in RT and in R1–R5 to be monitored and discriminated, using a two-wire system, and is not limited by the relative size of such changes. In this embodiment, $V_i$ is a time-varying input voltage source 61, as will be described herein, applied between contact points 64 and 66, the time-variation of which is consistent with the time constants of the circuit elements, and $V_o$ is an output voltage 68, which is sampled on a basis that is consistent with the time constants of the circuit elements, as will be described herein, to allow for discrimination of resistance changes due to brake lining temperature changes from resistance changes due to changes in brake lining thickness. The arrangement of the alternate embodiment of the electrical circuit as shown in FIG. 3 allows the output of the resistor array 50 to be monitored such that the brake lining 16 wear can be detected along with the brake lining 16 temperature using only two wires to connect the substrate 53 with the control unit 56. A capacitor C is connected between the resistor R1 and thermistor RT at one end and to contact point 66 at a second end to create a time constant that allows the noncontinuous measurement of first the value of thermistor RT and sometime later the value of thermistor RT plus R1–R5 depending if they have been switched into the circuit by the breaking of one or more wire loops L1–L5.

Voltage source 61, $V_i$, supplies a pulsating d.c. voltage, which varies between zero volts and $V_i$ volts. The source remains at $V_i$ volts for a period of time which is long compared to $\overline{R_T}C$, where $\overline{R_T}$ is the maximum expected value of $R_T$. The source then transitions to zero volts and remains at zero for a period of time which is at least long with respect to $\overline{R_T}C$, this to allow capacitor C to fully discharge.

Initially, the voltage between contact points 64 and 66 is at time $t_i$ sampled immediately upon the transition of the voltage source from zero volts to $V_i$ volts. The voltage, $V_o$, resulting from this measurement is $$V_o(t_1) = V_i \frac{R_T}{R_T+R_S}$$

since G provides an instantaneous, zero-ohm by-pass of the resistor array, R1–R5, and where $R_S$ has some pre-selected, fixed value. The next sample of $V_o$ is taken at time $t_2$, such that $t_2$-$t_1$ is long relative to $\overline{R_T}C$, but such that this sample occurs prior to the time that the voltage source, $V_i$, transitions to zero volts. The voltage, $V_o$, resulting from this measurement, is $$V_o(t_2) = V_i \frac{R_T+MR_O}{R_T+R_S+MR_O}$$

where M≤N is the number of wire loops that have been broken. Thus, the particular circuit uses the capacitor G to isolate the resistance $MR_o$, which represents the wear of the brake lining 16, from the resistance $R_T$, which varies due to the operating temperature of the brake lining 16.

From the voltage measurements, the separate resistances, $R_T$ and $MR_o$, can be obtained, in terms of the known resistance, $R_S$, as $$R_T = \frac{V_o(t_1)}{V_i - V_o(t_1)} \cdot R_S$$

and $$MR_O = \left( \frac{V_o(t_2)}{V_i - V_o(t_2)} - \frac{V_o(t_1)}{V_i - V_o(t_1)} \right) \times R_S$$

This calculation is made within the control unit 56 with the result being relayed using the output line 58 to some type of output display or other monitoring device. Thus, any time that both measurements are to be taken, the voltage source 61 must be turned off for an adequate period of time for the capacitor to discharge and then turn back on to supply voltage where the voltage potential between contact points 64 and 66 is taken at an initial time and then at a later time with the calculation then being made in the control unit 56 to determine the degree of brake lining 16 wear and operating temperature.

Although this present invention has been described in its preferred form within a certain degree of particularity, it is understood that the present disclosure of the preferred embodiment has been made only by way of example, and that numerous changes in the detail construction in combination and arrangement of the elements may be resorted to without parting from the spirit and the scope of the invention as hereinafter claimed.

I claim:

1. A method of noncontinuously measuring the temperature and wear of a brake lining comprising:
   providing a plurality of serially connected wire loops and a resistive temperature sensor serially connected to said wire loops and mounted in a cavity formed in said brake lining;
   providing a plurality of resistors electrically connected at least one each to each of said plurality of wire loops;
   providing a capacitor electrically connected across said plurality of resistors;
   providing an electrical current to said plurality of resistors and said resistive temperature sensor and said capacitor;

turning off said electrical current, the turning on said electrical current;

monitoring the electrical potential across said resistive temperature sensor at an initial time;

processing said electrical potential to determine an operating temperature of said brake lining; and then after said initial time processing said electrical potential to determine an extent of wear of brake lining wear.

2. A temperature and wear sensor for a vehicle friction brake of the type having a member to be braked and a friction member having a brake lining for engagement with said member to be braked comprising:

a plurality of wire loops disposed within said brake lining where each of said wire loops is positioned at a predetermined height, said wire loops being electrically connected in series;

a plurality of resistors where each one of said resistors is electrically connected across a respective one of said wire loops;

a resistive temperature sensor disposed within said brake lining and electrically connected in series with said plurality of resistors;

a capacitor electrically connected in parallel with said plurality of resistors;

a source of electrical current connected to one of said wire loops and connected to said resistive temperature sensor to form a series circuit;

an electrical voltage measurement means for measurement of the electrical voltage across said plurality of resistors and said resistive temperature sensor.

3. The temperature and wear sensor of claim 2, wherein said resistive temperature sensor is a thermistor.

4. The temperature and wear sensor of claim 2, wherein said resistive temperature sensor is a resistive temperature detector (RTD).

5. A temperature and wear sensor for a vehicle brake comprising:

a rotating member to be braked;

a friction member having a brake lining for frictional engagement with said rotating member;

a sensor having a sensing head extending into a cavity formed in said brake lining, said sensing head containing a plurality of wire loops disposed at different heights within said sensor head and a resistive temperature sensor, said wire loops and said resistive temperature sensor being electrically connected in series;

a sensor body mounted to said friction member, said sensor body containing a plurality of resistors, electrically connected to said wire loops such that breakage of one of said wire loops connects one of said resistors in series with said resistive temperature sensor;

a capacitor connected in parallel with said plurality of resistors;

a control unit electrically connected to said resistive temperature sensor and said plurality of resistors, said control unit having a source of electrical power connected in series with said resistive temperature sensor and said plurality of resistors and an electrical voltage measurement means for measuring an electrical potential across said resistive temperature sensor and said plurality of resistors.

6. The temperature and wear sensor of claim 5, wherein said resistive temperature sensor is a thermistor.

7. The temperature and wear sensor of claim 5, wherein said resistive temperature sensor is a resistive temperature detector (RTD).

* * * * *